(12) United States Patent
Coder

(10) Patent No.: US 11,000,011 B2
(45) Date of Patent: May 11, 2021

(54) EQUINE SUPPORT BOOT WITH V-SHAPED SLING STRAP

(71) Applicant: PRO EQUINE GROUP, INC., Deerfield, IL (US)

(72) Inventor: Stephen Coder, Godley, TX (US)

(73) Assignee: PRO EQUINE GROUP, INC., Deerfield, IL (US)

( * ) Notice: Subject to any disclaimer, the term of this patent is extended or adjusted under 35 U.S.C. 154(b) by 513 days.

(21) Appl. No.: 15/225,295

(22) Filed: Aug. 1, 2016

(65) Prior Publication Data

US 2017/0027132 A1 Feb. 2, 2017

Related U.S. Application Data

(60) Provisional application No. 62/199,745, filed on Jul. 31, 2015.

(51) Int. Cl.
*A01K 13/00* (2006.01)
*B68C 5/00* (2006.01)

(52) U.S. Cl.
CPC ............. *A01K 13/007* (2013.01); *B68C 5/00* (2013.01)

(58) Field of Classification Search
CPC ........ B68C 5/00; A01K 13/006; A01K 13/007
USPC .................................. 54/82, 1; 119/850, 856
See application file for complete search history.

(56) References Cited

U.S. PATENT DOCUMENTS

| | | | | |
|---|---|---|---|---|
| 3,506,000 | A * | 4/1970 | Baker | A61F 13/066 2/22 |
| 5,107,827 | A * | 4/1992 | Boyd | A61D 9/00 602/58 |
| 5,363,632 | A | 11/1994 | Armato | |
| 5,871,458 | A * | 2/1999 | Detty | A01K 13/007 54/82 |
| 5,910,126 | A * | 6/1999 | Wilson | A01K 13/007 119/850 |
| 6,308,332 | B1 | 10/2001 | Tollini | |
| 8,443,763 | B2 | 5/2013 | Heid et al. | |
| 2004/0031246 | A1 | 2/2004 | Springs | |

(Continued)

OTHER PUBLICATIONS

Notification of Transmittal of the International Search Report and Written Opinion for International Appl No. PCT/US2016/044986 dated Oct. 7, 2016 .

(Continued)

*Primary Examiner* — Lisa L Tsang

(74) *Attorney, Agent, or Firm* — K&L Gates L.L.P

(57) ABSTRACT

An embodiment of the disclosed equine support boot comprises a base portion, at least one upper strap, and a v-shaped sling strap attached to a top section of the base portion, the sling strap being configured to pull the fetlock joint towards the attachment point to apply an upward force on the leg thus decreasing tensile stress in a localized area. In this embodiment, the disclosed equine support boot represents an improvement over known equine support boots because in known boots, sling straps rap horizontally around the horse's leg and thus do not provide an upward vertical force on the fetlock joint of the horse's leg. The use of a v-shaped sling strap in embodiments of the disclosed boot enables the straps themselves to apply an upward force toward the attachment point of the v-shaped strap when the boot is mounted on the horse's leg.

20 Claims, 6 Drawing Sheets

(56) References Cited

U.S. PATENT DOCUMENTS

2016/0324119 A1* 11/2016 Mills .................... A01K 13/007

OTHER PUBLICATIONS

Written Opinion of International Appl No. PCT/US2016/044986 dated Oct. 7, 2016.
International Search Report for Appl No. PCT/US2016/044986 dated Oct. 7, 2016.

* cited by examiner

EQUINE SUPPORT BOOT WITH V-SHAPED SLING STRAP

PRIORITY CLAIM

This application is a non-provisional of, and claims priority to and the benefit of U.S. Provisional Patent Application No. 62/199,745, filed on Jul. 31, 2015, which is incorporated by reference herein in its entirety.

COPYRIGHT NOTICE

A portion of the disclosure of this patent document contains material that is subject to copyright protection. The copyright owner has no objection to the photocopy reproduction of the patent document or the patent disclosure in exactly the form it appears in the Patent and Trademark Office patent file or records, but otherwise reserves all copyright rights whatsoever.

BACKGROUND

Every day, around the world, thousands of horses are bought, sold, and traded for a wide variety of uses. Some are race horses, some are show horses, and some simply work day in and day out on farms and ranches throughout the world. Regardless of how they are used, horses must be cared for and maintained if they are to continue to be healthy, strong, and valuable.

Vast sums are money are spent on the health and maintenance of horses. Hundreds of millions of dollars are spent on tools, tack, equipment, gear, supplies, accessories, training, and veterinary services to ensure that horses remain healthy and fit. Not only are horses treated after they have become injured, but significant resources are expended to prevent injuries from ever occurring. In recent years, the emphasis on prevention of injuries to horses has increased dramatically. Significant strides have been made in the areas of medicine, education, training, and equipment to help reduce the types and numbers of injuries sustained by horses.

One area of the equine industry that has seen tremendous growth is protective wear for horses' legs. These days, a myriad of products are available to protect a horse's legs from injury, including many different types of ankle boots, skid boots, splint boots, knee boots, support boots, and leg wraps. These products often offer new designs and incorporate new materials. Unfortunately, some of these products perform their advertised and intended purposes, and some do not. For example, some boots are advertised as support boots, but provide little or no support whatsoever.

Previous designs of equine support boots, such as U.S. Pat. No. 8,443,763, disclose a sling strap attached to a base that provides a circumferential compressive force on a horse's lower limb in an effort to decrease tensile stress at the fetlock joint. FIG. 1 illustrates an embodiment of such known equine support boots. In such previous equine support boots, the fastening points of the ends of the straps are on the same horizontal plane as the attachment site. The straps wrap around the lower limb of the horse and provide circumferential support to a horse's fetlock joint. While the base of the boot itself may provide some upward support, the sling straps do not assist in that upward support and instead merely provide compressive forces around the horse's lower limb.

Thus, although there have been significant developments in the area of equine support boots, including the development of the boot illustrated in FIG. 1, considerable shortcomings remain.

SUMMARY

The equine support boot disclosed herein provides support to the fetlock joint and the bones, tendons, and ligaments, and other anatomical structures associated with the fetlock joint. In various embodiments, the disclosed support boot restricts and selectively controls the movement of the fetlock joint. In these embodiments, the disclosed boot includes a body and a v-shaped sling strap affixed or attached to the upper part of the body. In these embodiments, due to the v-shaped design of the sling strap, the point of the v-shaped strap can be affixed or attached above the fetlock joint. When the boot is applied to the horse's limb, the straps are wrapped downward and around the from the attachment site and therefore provide an upward force that decreases tensile stress in a localized area. By configuring the sling straps into a v-shaped component, both circumferential support (as in the prior art) and upward support is achieved.

When applied, the support boot extends from the proximal cannon bone to the distal pastern. The support boot covers and protects areas proximal to the fetlock joint, and provides support to the flexor tendons and suspensory ligament by decreasing the palmar/plantar movement, i.e., 'bowing,' of these structures during load-bearing. The v-shaped sling strap includes two extensions extending from the attachment point and may be fastened to apply an upward force on the leg.

The upward force decreases tensile stress in the localized area between a palmer/planter aspect of a proximal pastern and a ventral portion of the proximal sesamoid bone. The area of coverage and the materials used in the construction of the support boot and its component parts also provides protection from blunt force injuries, such as over-reach, interference, run-down injuries, and others.

The support boot may be used both as an injury prevention device and as a therapeutic device for horses that have already been injured. For horses that have already been injured, the support boot provides stability in the rehabilitation process, which allows the horse to react better to treatment. Use of the support boot during rehabilitation of a lame horse can reduce the overall time required to rehabilitate the horse.

The support boot may be utilized in a wide variety of configurations. Although the support boot is described herein with respect to an orthopedic device, the support boot may also be configured for use as a skid boot to add cushioning between a horse's fetlock joint and the ground, or for use a splint boot to add support, cushioning, and protection from crossover injuries.

DETAILED DESCRIPTION

The equine support boot disclosed herein improves known equine support boots by providing a single, v-shaped sling strap as opposed to multiple, straight sling straps. In embodiments of the disclosed equine support boot, the single, v-shaped sling strap is affixed, such as by sewing, to an upper portion of the equine support boot. In these embodiments, the point of the v-shaped strap is sewed to the body of the boot, with the open end of the v-shaped strap extending downward toward the bottom of the boot. Embodiments of the disclosed equine support boot can also incorporate a foam insert (removable or permanent) to provide for padding between the horse's fetlock joint and the boot, as is described, for example, in U.S. Pat. No. 8,443,763, which is incorporated by reference in its entirety.

In operation, embodiments of the disclosed equine support boot are applied to the fetlock joint of a horse's leg such that a pair of linear seams achieved with appropriate stitching, cups the horse's hoof. A plurality of horizontally-oriented circumferential straps are wrapped horizontally around the horse's leg and affixed, such as using hook-and-loop fabric techniques, to the body of the boot. In various embodiments, these horizontally-oriented circumferential straps provide a compressive force and maintain the boot around the horse's leg.

A v-shaped sling strap is affixed to an upper portion of the boot, either by being sewed to the outside of the boot and extending downward therefrom, or by being sewed to the inside of the boot, extending through a slot in the boot to the outside of the boot, and extending downward therefrom. In these embodiments, the v-shaped sling strap extends downward from the top portion of the front of the boot. The security provided by the plurality of horizontally-oriented circumferential straps enables a first extension of the v-shaped sling strap to be wrapped downward and under the fetlock joint and affixed, such as with hook-and-loop fabric techniques, to the body of the boot. A second extension of the v-shaped sling is thereafter wrapped downward and under the fetlock joint and affixed, such as with hook-and-loop, on top of the first extension.

Figure 1:
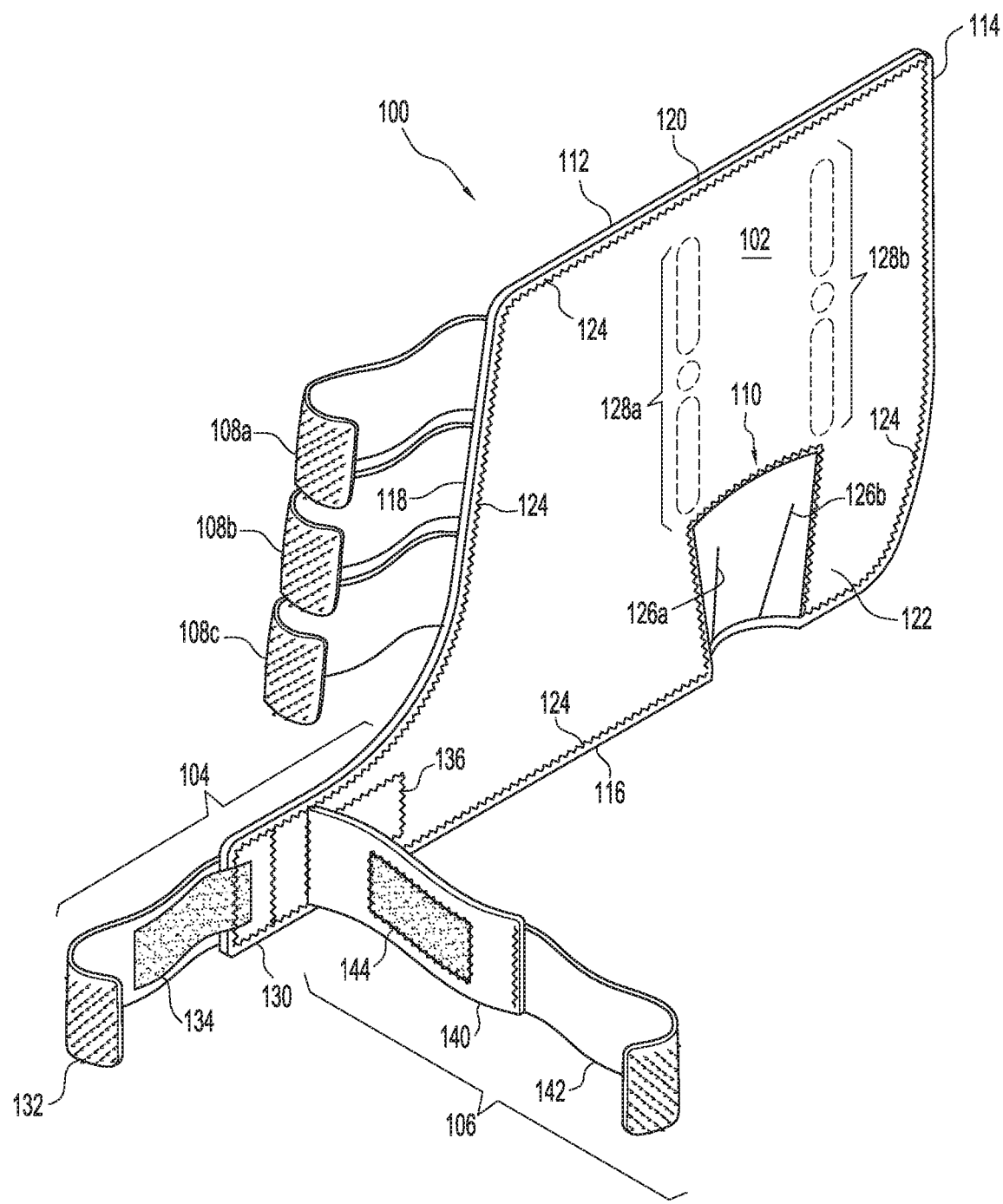
FIG. 1 illustrates a perspective view of a prior art equine boot whose drawbacks are improved and overcome by the equine boot disclosed herein.

In embodiments of the disclosed equine support boot, the use of a v-shaped sling strap provides several benefits. First, because the attachment point for such a v-shaped sling strap is above the fetlock joint, and the extensions are wrapped downward and around the fetlock joint, the v-shaped sling strap provides more upward support than prior art equine supports (such as the boot illustrated in FIG. 1). Moreover, because the pair of extensions of the v-shaped sling strap can be non-rectangular (i.e., they can have portions that are relatively wider than the end portions, wrapping the pair of sling straps as described herein forms a seal between the horse's leg and the bottom of the disclosed boot, preventing or limiting dirt or other debris from entering the boot. Third, the disclosed equine support boot improves on known equine support boots by providing a single-piece sling strap, as opposed to a multi-part strap whose effectiveness is dependent upon the mating of one part of the strap with another. Finally, in embodiments where the v-shaped sling strap is secured to the interior of the boot and extend through a slot to the exterior, the attachment point of the v-shaped sling strap is less likely to snag or catch during use, and the strap is therefore less likely to be torn off. In addition, this configuration provides for improved aesthetic appearance at least by hiding the sewn seam and by enabling a manufacturer's logo to be positioned prominently on the top front of the boot, on the outside of where the strap is sewed to the inside.

Figure 2:
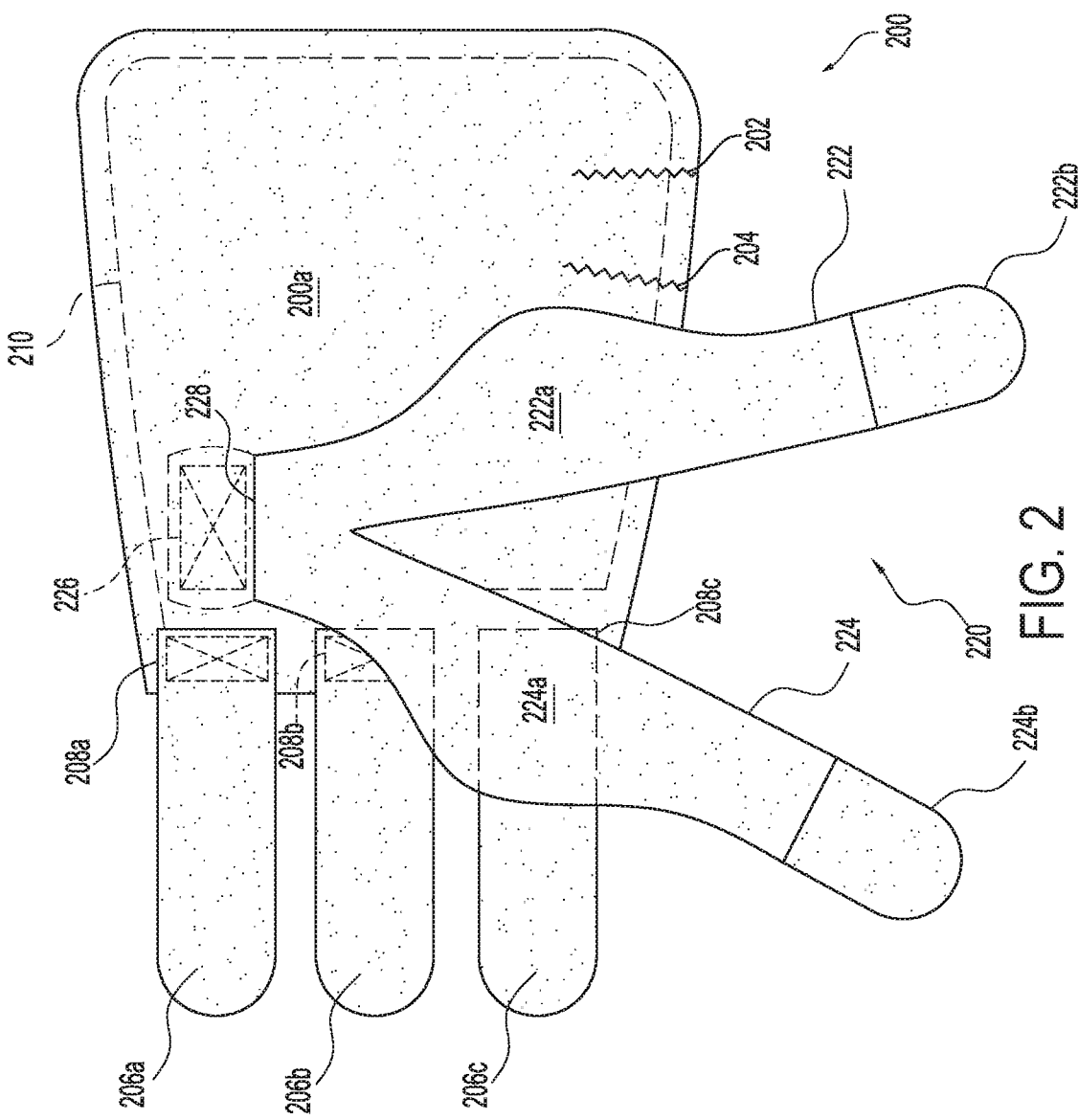
FIG. 2 illustrates a front view of an embodiment of the improved equine boot disclosed herein, wherein the boot is not applied to an animal's fetlock joint.

Referring now to FIG. 2, an embodiment of the equine boot 200 disclosed herein is illustrated in an un-applied, laid-flat form. The illustrated embodiment is viewed from the front or outside of the equine support boot, meaning that the surface 200a of FIG. 2 is the surface of the boot that does not contact a horse's leg when installed. In one embodiment, the material from which the body 200a is constructed is elastic to allow for the boot 200 to be secured to different sized horse legs. For example, the body 200a may be neoprene or some other suitable material.

In various embodiments, the elastic material from which the body 200a is made provides an amount of padding. In certain embodiments, additional padding is provided between an outer and an inner layer of the body 200a, to further increase comfort when applied to a horse's leg. In these embodiments, the seam 210 of FIG. 2 is designed to secure the padding between an outer and inner layer of the body 200a.

In the embodiment of FIG. 2, the zig-zag lines 202 and 204 are vertical, linear seams formed by known sewing techniques to cup the horse's hoof when the boot is applied to the fetlock joint of the horse. In the illustrated embodiment, the vertical linear seams 202 and 204 are positioned on the front of the horse's leg when the boot 200 is applied to the horse's leg.

After application in the correct orientation, a plurality of horizontally-oriented circumferential straps 206a, 206b, and 206c are wrapped around the horse's leg and affixed to the body 200a of the illustrated equine support boot. In the illustrated embodiment, the horizontally-oriented circumferential straps 206a, 206b, and 206c are made from a different material than the body 200a of the boot 200. For example, the horizontally-oriented circumferential straps 206a, 206b, and 206c may be constructed of a non-elastic fabric, such as nylon fabric, such that when the boot 200 is wrapped around the horse's leg during application, the body 200a stretches but the horizontally-oriented circumferential straps 206a, 206b, and 206c do not. In one embodiment, the horizontally-oriented circumferential straps 206a, 206b, and 206c also include an appropriate fastening mechanism on the inside surface (i.e., the surface not illustrated in FIG. 2), such as half of a hook-and-loop fastening mechanism. In this embodiment, the body 200a of the equine support boot 200 forms the other half of the hook-and-loop fastening mechanism, either because of the material of the body 200a itself or because appropriate mating material is affixed to the surface of the body 200a (not shown).

In the illustrated embodiment, the horizontally-oriented circumferential straps 206a, 206b, and 206c are affixed or attached to the body 200a at sewed attachment points 208a, 208b, and 208c. In embodiments where the body 200a is formed of a plurality of layers, the sewed attachment points 208a, 208b, and 208c may be positioned between a pair of layers forming the body 200a. This arrangement may provide a wider range of attachment points on the body 200a of the boot 200, and may also improve aesthetic appearance by hiding the stitching needed to affix the horizontally-oriented circumferential straps 206a, 206b, and 206c to the body 200a of the boot 200.

Referring still to FIG. 2, a v-shaped sling strap 220 is illustrated. As noted above, the v-shaped sling strap 200 provides substantial improvement over the prior art at least because it provides for more upward force applied to the fetlock joint of the horse's leg and because it seals the bottom of the boot, preventing dirt and other particles from entering an applied boot. In the illustrated embodiment, strap 220 includes a pair of extensions 222 and 224 and an attachment point 226. Each extension 222 and 224 in the illustrated embodiment includes a widened portion 222a and 224a. In the illustrated embodiment, these wider portions assist in sealing the bottom of the boot when the extensions 222 and 224 are wrapped downward and around a horse's fetlock joint.

Each extension 222 and 224 of V-shaped sling strap 220 also includes a fastening portion 222b and 224b, respectively. These fastening portions 222b and 224b provide for fastening of the extensions 222 and 224 to the body 200a of the equine support boot 200, such as by providing half of a hook-and-loop fastening mechanism. In this embodiment, the body 200a provides for the other half of the hook-and-loop fastening mechanism, either because of the material from which the body 200a is constructed or because of an additional mating material fastened to the surface of the body 200a (not shown).

In the illustrated embodiment, the attachment point 226 of the v-shaped sling strap 220 mates with the body 200a on the back side of the body 200a, which is the side obscured from view in the embodiment of FIG. 2. In this embodiment, the attachment point 226 extends through a slot 228 in the body 200a, and an appropriate fastening mechanism (e.g., sewing) is used on to affix the attachment point 226 to the inside of the body 200a of the equine support boot 200. In other embodiments, the attachment point 226 is used to affix the v-shaped sling strap to the front of the body 200a (thus obviating the need for slot 228), or is used to affix the v-shaped sling strap between a pair of layers of the body 200a (meaning the slot 228 is in an outer layer of the body 200a but not an inner layer of the body 200a). In various embodiments, sewing is used around the slot 228 to reinforce the edges of the slot and ensure that the strap does not tear the body 200a and that the edges of the slot 228 do not fray.

In the embodiment of FIG. 2, the v-shaped sling strap 220 and the slot 228 are positioned relative to the horizontally-oriented circumferential straps 206a, 206b, and 206c such that the v-shaped sling strap 220 extends downward between the top strap 206a and the middle strap 206b. While the precise position of the v-shaped sling strap 220 relative to the straps 206 may vary in different embodiments, in certain embodiments the v-shaped sling strap 220 is positioned such that the horizontally-oriented circumferential straps 206 can wrap around the horse's leg and not interfere with the attachment point 226 of the v-shaped sling strap 220 even if the straps 206 attach to the body 200 at a point vertically aligned with the attachment point 226. This arrangement also improves structural stability and aesthetic appearance, as the v-shaped sling strap 220 extends from within the portion of the boot 200 where the horizontally-oriented circumferential straps 206a, 206b, and 206c attach to the body 200a, meaning that the fabric at that point is thicker and more resilient. In addition, if the horizontally-oriented circumferential straps 206a, 206b, and 206c are constructed of inelastic fabric, the inability of stretching further enhances the structural stability of the portion of the boot from which the v-shaped sling strap extends.

Figure 3:
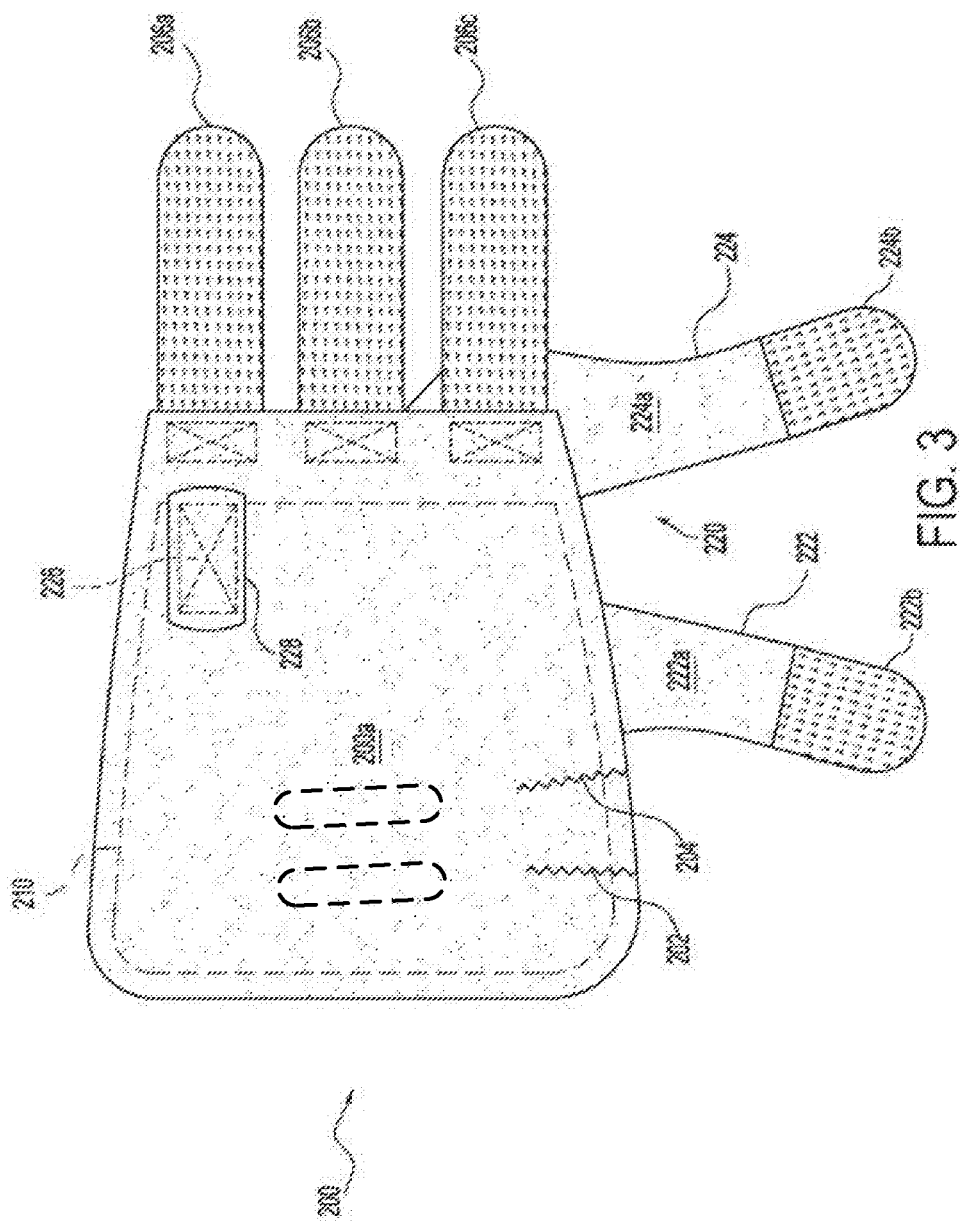
FIG. 3 illustrates a back view of an embodiment of the improved equine boot disclosed herein, wherein the boot is not applied to an animal's fetlock joint.

FIG. 3 illustrates the equine support boot 200 of FIG. 2 from the opposing side of the boot 200. In the embodiment of FIG. 3, corresponding features are labeled with the same numbered indicators as discussed above with regard to FIG. 2. Where not visible in FIG. 3 (e.g., sewed attachment points 208a, 208b, and 208c), features illustrated in FIG. 2 are not illustrated in FIG. 3. It should be appreciated that in the embodiment of FIG. 3, only the bottom portion of slot 228 is visible, whereas in the view of FIG. 2, the top portion of the slot 228 was visible. In addition, in the embodiment of FIG. 3, the attachment point 226 is on the visible side of the body 200a, and is sewed to that visible side. In the embodiment of FIG. 2, the attachment point was illustrated but was on the non-visible side of the body 200a. As noted above, this arrangement provides for both structural advantages in that the attachment point is less likely to catch or snag during use, meaning it less likely that the v-shaped sling strap will be pulled off the body. This arrangement also provides for an aesthetic benefit in that the attachment point 226 is not visible when the boot 200 is affixed to a horse's leg.

It should be appreciated that in embodiments where the attachment point 226 is between a pair of layers of material, the attachment point would not itself be visible either from the vantage point of FIG. 2 or the vantage point of FIG. 3. Also in such embodiments, the slot 228 would not be visible from the vantage point of FIG. 3. Nonetheless, the same structural and aesthetic advantages would be provided as discussed above with regard to the embodiment illustrated in FIGS. 2 and 3.

Figure 4:
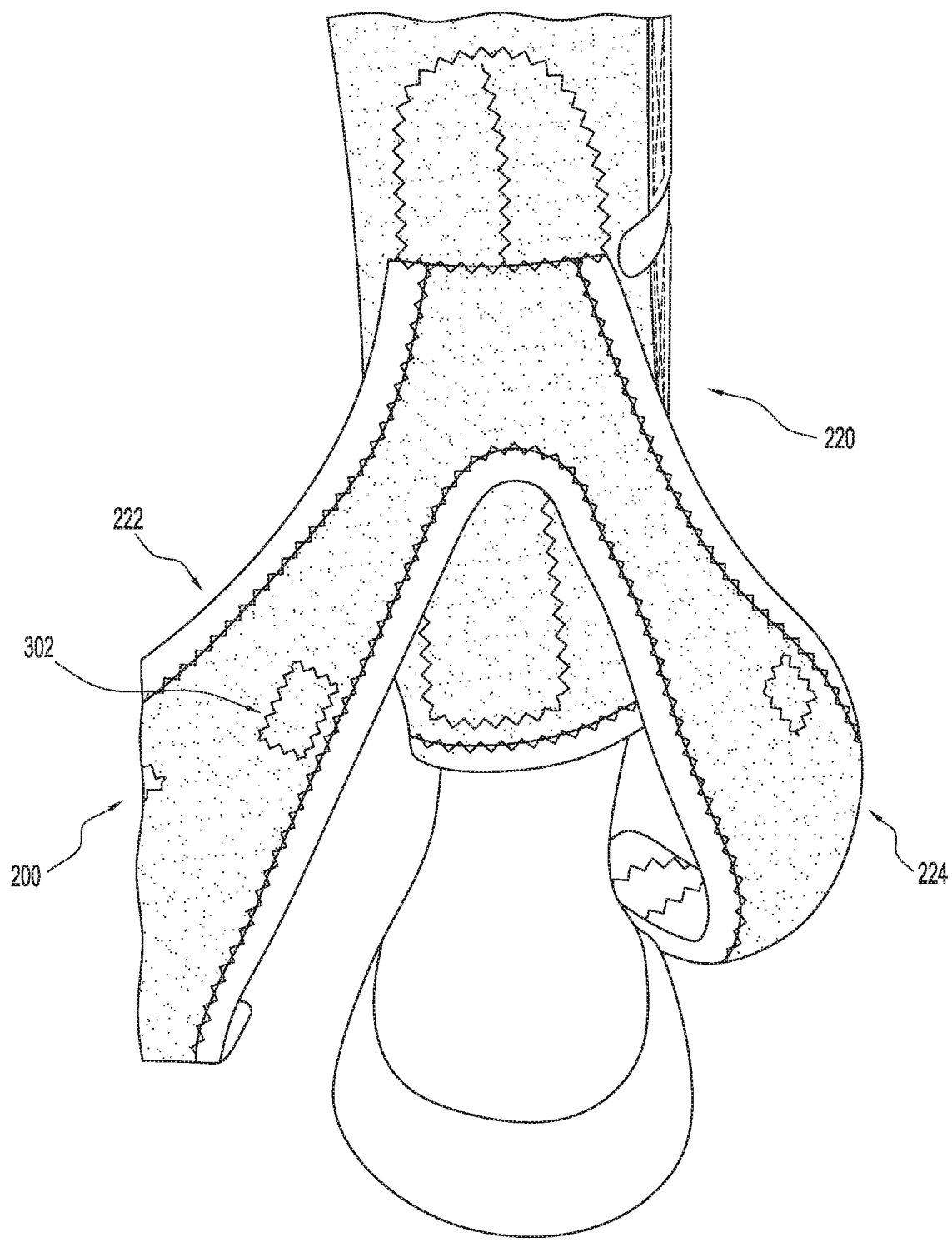
FIG. 4 illustrates a view of an embodiment of the improved equine boot disclosed herein, wherein the horizontal circumferential straps are tightened but neither extension of the v-shaped sling strap has been tightened.

FIG. 4 illustrates a view of an embodiment of the improved equine boot disclosed herein, wherein the horizontal circumferential straps are tightened but neither extension of the v-shaped sling strap has been tightened. In the embodiment of FIG. 4, the equine boot 200 has been fastened to the horse's leg using the plurality of horizontally-oriented circumferential straps 206a, 206b, and 206c. However, in the embodiment of FIG. 4, the extensions 222 and 224 of the v-shaped sling strap have not been wrapped under the fetlock joint and secured. In the illustrated embodiment, it can be seen that the v-shaped sling strap is fastened to the boot 200 at a point on the top of the boot located on the front of the horse's leg. It will be appreciated that in the form illustrated in FIG. 4, the equine support boot 200 is applying a compressive force to the horse's leg, but is not applying an upward force on the fetlock joint because the v-shaped sling strap has not been wrapped and fastened to the equine support boot.

In FIG. 4, rectangular item 302 is the stitching securing a piece of hook material to the inside of the extension 222. In this embodiment, the hook material indicated by rectangle 302 is configured to engage with the loop surface of the body 200a to prevent the length of the extension 222 from shifting during use and after fastening of the extension 222 to the body 200a.

Figure 5:
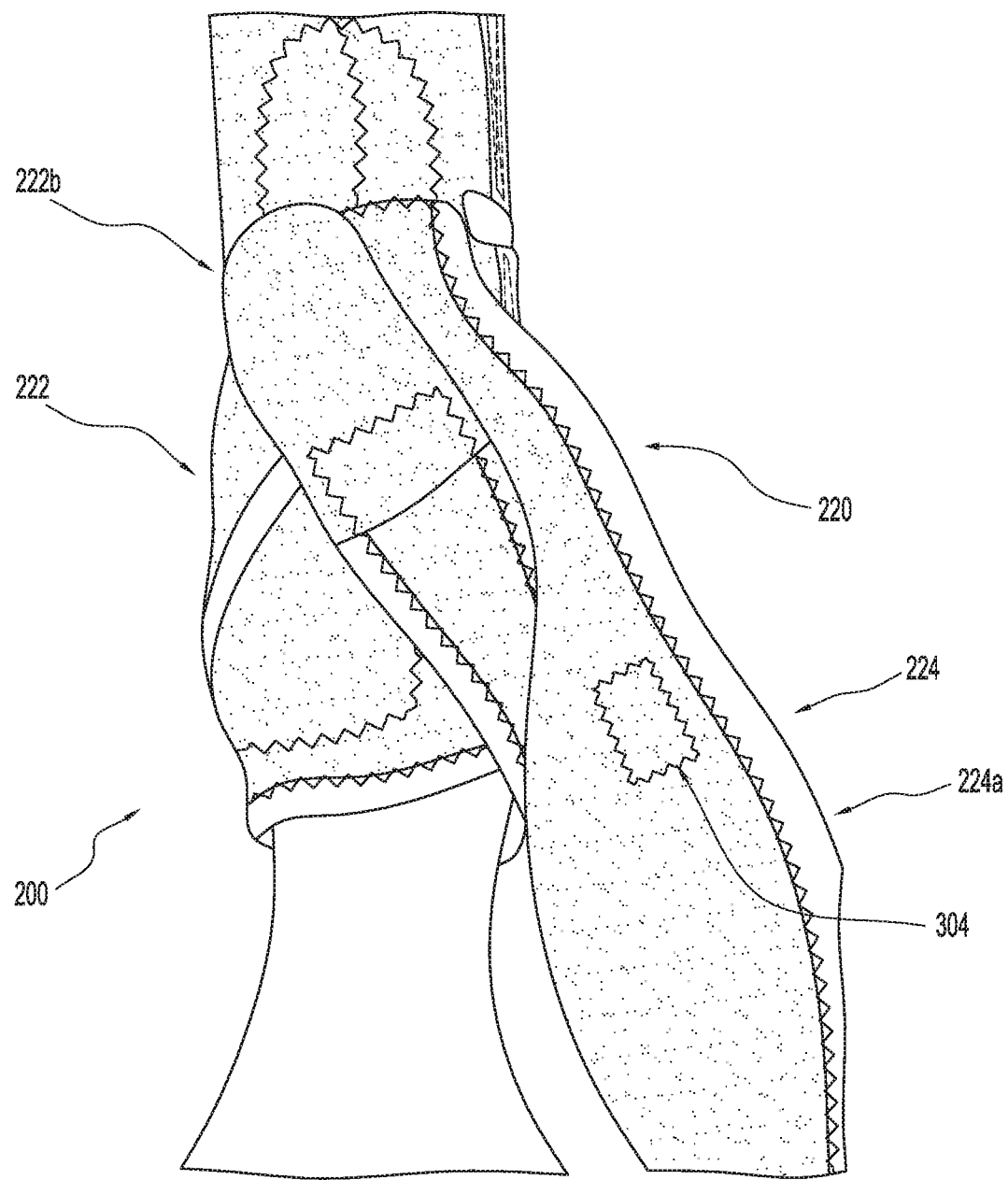
FIG. 5 illustrates a view of an embodiment of the improved equine boot disclosed herein, wherein the horizontal circumferential straps are tightened and a first extension of the v-shaped sling strap has been tightened.

FIG. 5 illustrates a view of an embodiment of the improved equine boot disclosed herein, wherein the horizontal circumferential straps are tightened and a first extension of the v-shaped sling strap has been tightened. In the embodiment of FIG. 5, the left-side extension 222 of the v-shaped sling strap has been wrapped around behind the horse's leg, under the fetlock joint, and up the equine boot 200 on the front side of the horse's leg. In the illustrated embodiment, fastening portion 222b of extension 222 of v-shaped sling strap 220 is attached to the boot by way of hook-and-loop material on the fastening portion 222b and the body of the boot 200. Also in the illustrated embodiment, extension 224 of sling strap 220 has not been wrapped under and around the fetlock joint at the illustrated point in time. Instead, extension 224 (including widened portion 224a) is hanging down from the attachment point 226 (not shown), ready to be wrapped under the fetlock joint and around the front of the leg for affixing to the front of the boot 200.

In FIG. 5, rectangular item 304 is the stitching securing a piece of hook material to the inside of the extension 224. In this embodiment, the hook material indicated by rectangle 304 is configured to engage with the loop surface of the body 200a and/or the extension 222 to prevent the length of the extension 224 from shifting during use and after fastening of the extension 224 to the body 200a and/or to the extension 222. In various embodiments, other shapes, sizes, and positions of hook material can be provided to provide for more robust, circumferential fastening of extensions 222 and 224 at various positions along their length.

Figure 8:
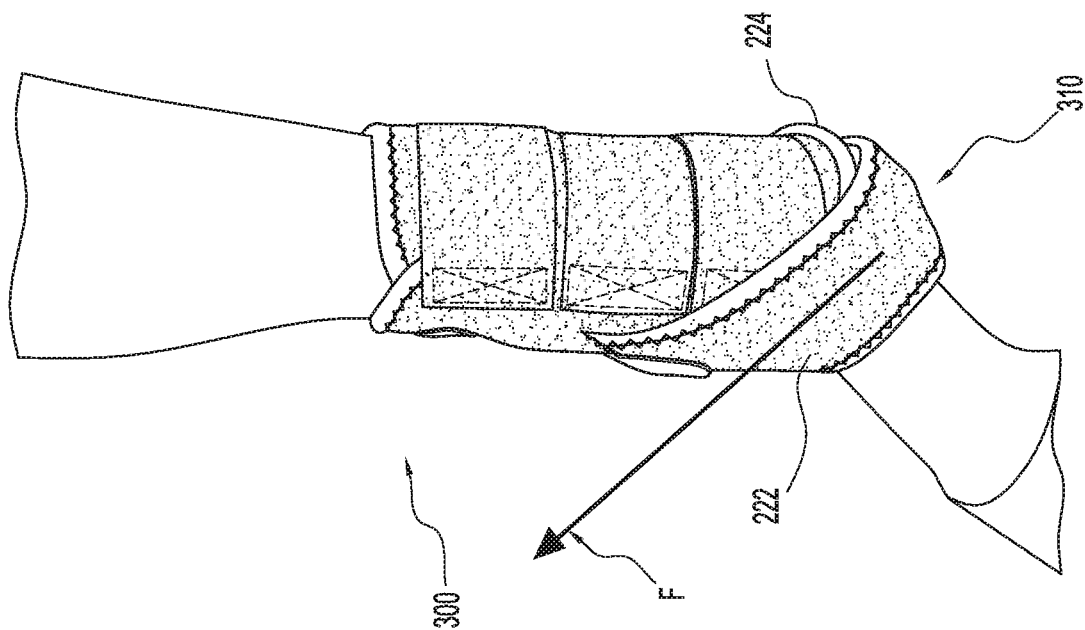
FIG. 8 illustrates a third, side view of an embodiment of the improved equine boot disclosed herein, wherein the boot is applied to an animal's fetlock joint.
Figure 7:
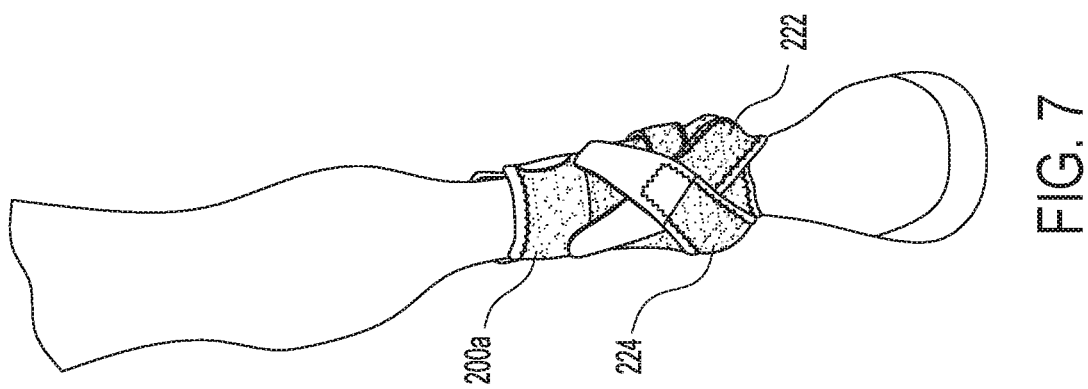
FIG. 7 illustrates a second, partial side view of an embodiment of the improved equine boot disclosed herein, wherein the boot is applied to an animal's fetlock joint.
Figure 6:
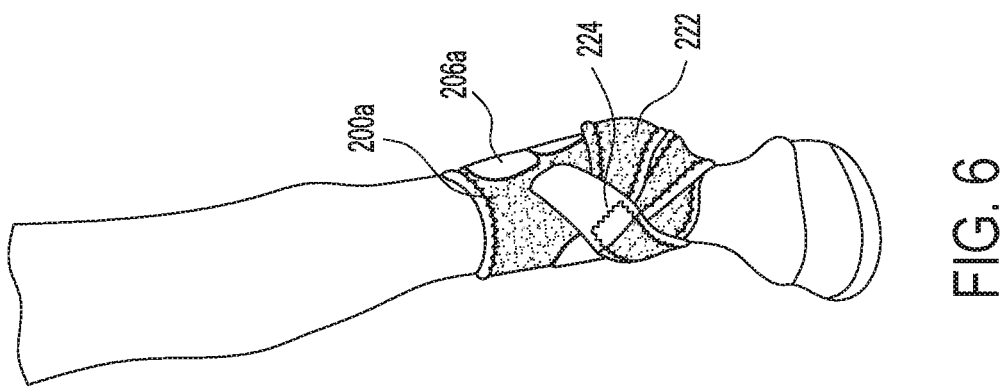
FIG. 6 illustrates a first, front view of an embodiment of the improved equine boot disclosed herein, wherein the boot is applied to an animal's fetlock joint.

Referring now to FIGS. 6-8, the embodiment of the equine support boot 200 illustrated in an un-applied condition in FIGS. 2 and 3 and in a partially-applied position in FIGS. 4 and 5 is shown applied to the leg of a horse. Although the views of FIGS. 6-8 are taken from slightly different angles, the following description relates to all three figures. Moreover, to the extent corresponding components labeled in FIGS. 2 and 3 are visible in FIGS. 4-6, those components have been labeled with like numerals in FIGS. 6-8.

In the embodiment of FIGS. 6-8, the equine support boot 200 is applied to the leg 300 of the horse by first positioning the seams (not shown) on the front of the horse's leg with the boot 200 in flat arrangement. Thereafter, horizontally-oriented circumferential straps 206a, 206b, and 206c are wrapped around the leg of the horse and attached to an appropriate portion of the body 200a using corresponding hook-and-loop fabric mechanisms. In wrapping the horizontally-oriented circumferential straps 206a, 206b, and 206c around the leg of the horse, care is taken to ensure that the v-shaped sling strap 220 extends from between the top horizontally-oriented circumferential strap 206a and the middle horizontally-oriented circumferential strap 206b.

As can be best seen in FIG. 8, the extensions 222 and 224 are pulled downward and around the back of the fetlock joint of the horse's leg. This is most clearly illustrated in area 310 of FIG. 8. In this embodiment, widened portions 222a and 224a are arranged around the bottom and back of the fetlock joint, substantially sealing the bottom of the boot when applied to the horse's leg.

As can be best seen in FIG. 7, the fastening portions 222b and 224b of the extensions 222 and 224 are then affixed to the body 200a of the boot, such as by mating appropriate hook-and-loop mechanisms on the fastening portions 222b and 224b with the body 200a. From FIG. 7, it is also apparent the seal provided by extensions 222 and 224 when wrapped around the bottom and back of the horse's fetlock joint 310.

In the illustrated embodiment, extensions 222 and 224 apply a force diagonally upward to the left against the bottom of the horse's fetlock joint 310 as illustrated in FIG. 8. In the illustrated embodiment, the direction of this force is illustrated by arrow "F." To apply the force along line F, the attachment point 226 provides one point against which the extensions 222 and 224 of v-shaped sling strap 220 can pull. The points at which the fastening portions 222b and 224b engage the body 200a of the equine boot 200 provide the other points against which extensions 222 and 224 can pull.

In various embodiments, the disclosed boot 200 includes one or more pieces of foam (not shown) within layers of the body 200a to cushion various parts of a horse's fetlock joint. For example, in various embodiment, a piece of foam between seams 202 and 204 cushions the front part of the horse's leg. In one embodiment, a piece of foam mounted within the widened portions 222a and 224a of the v-shaped sling strap 220 cushion the underside of the horse's fetlock joint when the extensions are wrapped around the leg and fastened to the body 200a.

As discussed above, in various embodiments the extensions of the v-shaped sling strap extend around the fetlock joint in different directions. In other embodiments, the extensions extend around the fetlock joint in a same direction.

In various embodiments, the angle between the extensions is of the v-shaped sling strap is approximately 45%. In other embodiments, the angle between the extensions is approximately 70%. In other embodiments, the angle between the extensions is selected depending on the size of a horse, such as based on its height, weight, and/or the circumference of the leg onto which the equine boot is to be applied.

In various embodiments, the attachment portions of the extensions of the v-shaped sling strap are configured to attach to the body of the equine support boot. In other embodiments, one or more of the attachment points is configured to attach to the outside of one or more other straps, such as the horizontal circumferential straps and/or the extensions of the v-shaped sling strap.

In various embodiments, the extensions of the v-shaped sling strap are formed from an elastic material that applies a variable force along the length of the extensions. In such embodiments, the amount of force applied to the extensions when pulled around the fetlock joint affects the amount of force applied to the fetlock joint. Accordingly, in embodiments where the extensions are formed of elastic material, when the extensions are releasably attached to the equine boot 200, the amount of force applied during releasable attachment affects the amount of upward force applied to the fetlock joint. In other embodiments, one or more of the extensions of the v-shaped sling strap are formed, at least in part, of inelastic material. In such embodiments, the force applied to the extensions does not provide for variable tightness, and any elasticity in the upward force applied to the fetlock joint is by virtue of the elasticity of the body of the equine support boot. In some embodiments, a first portion of the extensions is formed of elastic material (such as the widened portion 222a and 224a) and a second portion of the extensions is formed of inelastic material (such as attachment portions 222b and 224b).

In various embodiments, the horizontally extending circumferential straps can be formed of elastic material, inelastic material, or a combination of elastic and inelastic material, similar to the discussion of the extension of the v-shaped sling strap above. In these embodiments, the same characteristics are achieved with regard to adjustable force, although the direction of the applied force is toward the center of the horse's leg around the circumference of the equine support boot.

As used herein, hook-and-loop mechanisms involve a pair of materials, one of which includes a plurality of resilient hooks and one of which includes a plurality of loops. Attachment in these mechanisms can be achieved by pressing the two materials together, causing hooks to engage with loops. Attached components can be released by pulling the pair of materials in opposite directions, such that the hooks temporarily straighten and release the engagement with the loops. It should be appreciated that hook-and-loop density and material can be chosen as appropriate to provide for different attachment strengths, as is well understood by those of skill in the art. In one embodiment, the hook-and-loop engagement mechanism includes so-called "unbroken loop" or "UBL" material, which is more durable and provides for stronger engagement between a component with hooks and the component with the UBL material.

In various embodiments, the body 200a includes one or more optional tendon support members. These tendon support members may be semi-rigid, compliant structures that extend inwardly from the body 200a and are configured and arranged to engage the tendon grooves of the horse's lower leg. When the equine support boot 200 is applied to the lower leg of a horse, the tendon support members provide lateral support and stabilization to the flexor tendons, the suspensory ligament, the sesamoidean ligaments, the sesamoid bones, and other tendons, ligaments, and bones in the area of the fetlock joint and lower pastern. In addition, the tendon support members ensure that the equine support boot 200 is properly aligned during application to the horse's lower leg, and prevent rotation of the support boot 200 about the horse's leg during operation. Tendon support members may have various shapes, including elongated ribs, circular buttons and/or oval ridges. Tendon support members may be removable from the equine support boot, or may be integral and therefore non-removable.

The tendon support members may be implemented in a wide variety of materials, shapes, and sizes. For example, the tendon support members may be integral with and formed of the same material as body 200a. Alternately, the tendon support members may be formed of a different material, such as nylon, leather, rubber, plastic, or other suitable material. Further, the tendon support members may be coated or treated with other compliant materials.

The above description of is exemplary of the features of the apparatus disclosed herein. It should be understood that various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An equine support boot comprising:
a base portion configured to wrap around a fetlock joint of a leg so a front section of the base portion is disposed on a front portion of the leg;
at least one upper strap configured to secure the base portion around the leg above the fetlock joint with the front section disposed on the front portion of the leg; and
a v-shaped sling strap attached to a top section of the base portion at an attachment point, the attachment point being above the fetlock joint when the v-shaped sling strap is secured to the leg, the v-shaped sling strap including two extensions extending from the attachment point, the two extensions configured to extend under opposite sides of the fetlock joint while remaining above a hoof, for releasable attachment to the base portion or the at least one upper strap on the front portion of the leg, the two extensions pulling the fetlock joint toward the attachment point to apply an upward force on the leg, thus decreasing a tensile stress in a localized area between a palmar or plantar aspect of a proximal pastern and a ventral portion of a proximal sesamoid bone when the v-shaped sling strap is releasably attached to the front section.

2. The equine support boot according to claim 1, wherein a first extension of the two extensions extends under the fetlock joint in a first direction and a second extension of the two extensions extends under the fetlock joint in an opposite second direction.

3. The equine support boot according to claim 2, wherein the first extension and the second extension form an angle of 45° at the attachment point.

4. The equine support boot according to claim 1, wherein at least one of the extensions is configured to releasably attach to an outside portion of the at least one upper strap.

5. The equine support boot according to claim 1, wherein at least one of the extensions is configured to releasably attach to the front section of the base portion.

6. The equine support boot according to claim 1, wherein the base portion is formed from a plurality of layers.

7. The equine support boot according to claim 1, wherein the base portion comprises: at least one internal layer of neoprene; and
an exterior loop fabric layer adapted to releasably couple at least one upper strap or at least one of the extensions of the v-shaped sling strap via hook and loop fasteners.

8. The equine support boot according to claim 1, further comprising: at least one tendon support member carried by the base portion to engage tendon grooves above the fetlock joint, the at least one tendon support member being configured to provide localized lateral support and stabilization to at least one of flexor tendons, a suspensory ligament, a sesamoidean ligament, and a sesamoid bone.

9. The equine support boot according to claim 8, wherein the at least one tendon support member has a shape selected from the group consisting of: an elongated rib; a circular button; and an oval ridge.

10. The equine support boot according to claim 8, wherein the at least one tendon support member is removable.

11. The equine support boot according to claim 8, wherein the at least one tendon support member is removable from the base member.

12. The equine support boot according to claim 1, wherein at least a portion of each of the two extensions of the v-shaped sling strap is formed from an elastic material that applies a variable force along a length of the extensions when the extensions are releasably attached on the front portion of the leg, the variable force depending on force applied during releasable attachment.

13. The equine support boot according to claim 1, wherein each of the two extensions of the v-shaped sling strap is formed of inelastic material.

14. The equine support boot according to claim 1, which includes a plurality of upper straps, wherein at least one of the plurality of upper straps engages the base portion adjacent to the attachment point.

15. The equine support boot according to claim 1, wherein the base portion includes padding located between an outer and an inner layer of the base portion.

16. An equine support boot comprising:
- a base portion configured to wrap around a fetlock joint of a leg so a front section of the base portion is disposed on a front portion of the leg;
- at least one upper strap configured to secure the base portion around the leg above the fetlock joint with the front section disposed on the front portion of the leg; and
- a v-shaped sling strap attached to a top section of the base portion at an attachment point, the attachment point being above the fetlock joint when the v-shaped sling strap is secured to the leg, the v-shaped sling strap including two extensions extending from the attachment point, the two extensions each including a widened portion and configured to extend under opposite sides of the fetlock joint while remaining above a hoof, for releasable attachment to the base portion or the at least one upper strap on the front portion of the leg, the widened portions arranged around the bottom and back of the fetlock joint, the two extensions pulling the fetlock joint toward the attachment point to apply an upward force on the leg.

17. The equine support boot according to claim 16, wherein each of the widened portions of the two extensions is formed of elastic material.

18. The equine support boot according to claim 16, wherein at least one of the extensions is configured to releasably attach to an outside portion of the at least one upper strap.

19. The equine support boot according to claim 16, wherein at least one of the extensions is configured to releasably attach to the front section of the base portion.

20. An equine support boot comprising:
- a base portion configured to wrap around a fetlock joint of a leg so a front section of the base portion is disposed on a front portion of the leg;
- at least one upper strap configured to secure the base portion around the leg above the fetlock joint with the front section disposed on the front portion of the leg; and
- a v-shaped sling strap attached to a top section of the base portion at an attachment point, the attachment point being above the fetlock joint when the v-shaped sling strap is secured to the leg, the v-shaped sling strap including two extensions extending from the attachment point, the two extensions configured to extend around sides of the fetlock joint in the same direction while remaining above a hoof, for releasable attachment to the base portion or the at least one upper strap on the front portion of the leg, the two extensions pulling the fetlock joint toward the attachment point to apply an upward force on the leg, thus decreasing a tensile stress in a localized area between a palmar or plantar aspect of a proximal pastern and a ventral portion of a proximal sesamoid bone when the v-shaped sling strap is releasably attached to the front section.

* * * * *